350-406 SR DSS REFERENCE SEARCH ROOM
XR 2,849,180
7 x 4038R WP

FUNCTION GENERATOR HAVING CATHODE RAY MEANS FOR FOLLOWING EDGE OF BIREFRINGENT PATTERN

Filed June 18, 1953 3 Sheets-Sheet 1

HARRY E. BURKE
LELAND P. ROBINSON
ROBERT L. SINK
ROBERT M. STRASSNER
INVENTORS.

BY James B. Christie

ATTORNEY

2849180
OR IN 364/855

HARRY E. BURKE
LELAND P. ROBINSON
ROBERT L. SINK
ROBERT M. STRASSNER
INVENTORS.

BY James B. Christie

ATTORNEY

FUNCTION GENERATOR HAVING CATHODE RAY MEANS FOR FOLLOWING EDGE OF BIREFRINGENT PATTERN

Filed June 18, 1953 3 Sheets-Sheet 3

HARRY E. BURKE
LELAND P. ROBINSON
ROBERT L. SINK
ROBERT M. STRASSNER
INVENTORS.

BY James B. Christie

ATTORNEY

United States Patent Office 2,849,180

Patented Aug. 26, 1958

2,849,180

FUNCTION GENERATOR HAVING CATHODE RAY MEANS FOR FOLLOWING EDGE OF BIREFRINGENT PATTERN

Harry E. Burke and Leland P. Robinson, Pasadena, Robert L. Sink, Altadena, and Robert M. Strassner, Pasadena, Calif., assignors, by mesne assignments, to Consolidated Electrodynamics Corporation, Pasadena, Calif., a corporation of California Application June 18, 1953, Serial No. 362,541

6 Claims. (Cl. 235—61)

This invention relates to the production of an electrical signal of predetermined wave form and finds use as an arbitrary function generator, as a linearizer in data handling systems, and as an element of electronic computers.

Function generators have previously been developed, and one presently conventional embodiment comprises a cathode ray tube having an opaque mask obscuring a portion of the tube screen. Light emission from the screen is sensed by photosensitive means coupled in a servo loop which includes one pair of the deflecting plates of the tube. As the electron beam travels across the screen under the influence of a sweep voltage applied to another pair of deflection plates, the servo loop causes the beam to follow the contours of the opaque mask in opposition to a beam bias, and the voltage signal generated in the loop is proportional to these contours.

It has also been proposed to employ this type of function generator as a linearizer for non-linear signals, as for example of the type developed in telemetering applications.

In the present day FM telemetering systems, the output signals from the ground station discriminators or commutator-analyzers are, in general, non-linear functions of the physical phenomena which they are supposed to represent. In some cases the non-linearities may not be of sufficient magnitude to require correction. In many cases, however, they may be of such magnitude that some form of automatic linearization must be employed to reduce these non-linearities to a level where accurate computations can be made. In using a function generator or linearizer of the type described above, the non-linear signal is subject to correction, the output of the linearizer representing the corrected signal.

We have now discovered that greater simplicity and sensitivity may be realized with the linearization network operating to develop only an error signal which, when combined with the uncorrected and undisturbed non-linear input signal, develops a corrected signal as desired. A linearizer operating in this manner is characterized in that corrections are applied as required, only by addition to or subtraction from the uncorrected signal. When no correction is required, the output of the linearizer is an undistorted reproduction of the input signal.

The invention contemplates apparatus for linearizing a non-linear input signal comprising means operable responsive to the signal for developing non-linear correction signal, the instantaneous value of which is substantially equal and opposite to the corresponding instantaneous deviation of the non-linear input signal from linearity, and means for adding the correction signal to the non-linear input signal. "Deviation" of the non-linear signal is the variation of the signal from a zero reference curve.

In the system of the invention the uncorrected input signal is used to control the voltage on one set of deflection plates of a cathode ray tube, and otherwise by-passes the linearizing circuit. The screen of the cathode ray tube is masked, a preferred form of mask being hereinafter described, and a servo loop including photoelectric means controls another set of deflection plates causing the cathode ray beam to follow the contours of the screen mask. The voltage developed in this servo loop is proportional to the contours of the screen mask. Providing the mask is representative of deviations of the uncorrected input signal from the desired linearity, addition of this correction signal to the uncorrected input signal produces the desired linear corrected signal. The uncorrected input signal by-passes the cathode ray tube and servo loop and is mixed with the correction signal independently of these elements of the circuit.

The invention is herein described with particular emphasis on its application as a linearizer. However, and as will become apparent from the description thereof, the circuit is equally well suited to use as a function generator and such use is contemplated within the scope of this invention.

We have further discovered improvements in the masking of a cathode ray tube for purposes of function generation or linearization, which improvements take the form of an optical system enabling the use of two photosensitive elements in the servo loop. In this aspect the invention contemplates a signal generator comprising a cathode ray tube having horizontal and vertical deflection plates, means for applying a sweep voltage to one set of deflection plates, an optical polarizing filter mounted adjacent the screen of the cathode ray tube, a mask consisting of a birefringent optical retardation medium whose boundary conforms to the wave form of the signal to be generated, a pair of photosensitive elements, separate polarizing optical filters interposed between the mask and each photo sensitive element, the two filters being adjusted to pass light of different directions of polarization, and an amplifier connected to receive the outputs of the two photosensitive elements and to impress a signal on the other set of deflection plates determined as a function of the outputs of the two photosensitive elements.

Using a conventional opaque mask in a system of this character requires the imposition of a high bias on the electron beam of the cathode ray tube so that it will be biased into the unmasked portion of the tube in opposition to the control voltage applied through the servo loop. With the present system in which the servo loop is, by virtue of the two photosensitive elements and the birefringent rather than opaque mask, responsive to the position of the beam anywhere on the screen, this high bias is not necessary. As a consequence a higher loop gain is permitted without danger of driving the beam out of the operating range.

The invention will be more clearly understood from the following detailed description taken in conjunction with the accompanying drawing in which.

Figure 1:
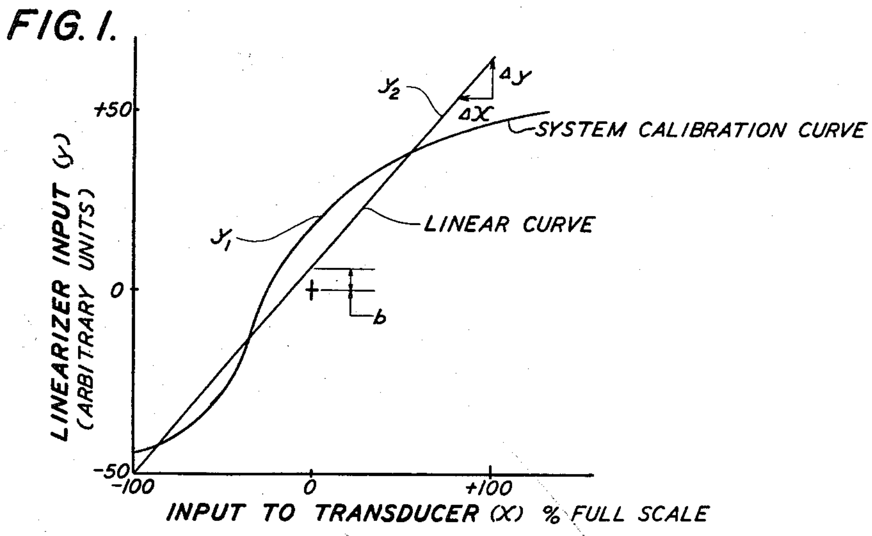
Fig. 1 shows graphically the character of a non-linear signal of the type under consideration, as related to a desired linearity.
Figure 2:
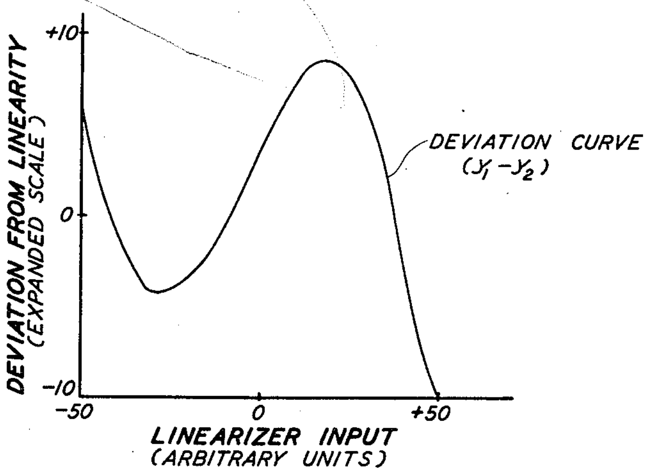
Fig. 2 is a graphical portrayal of the deviation of the non-linear signal from zero reference and on an expanded vertical scale.
Figure 3:
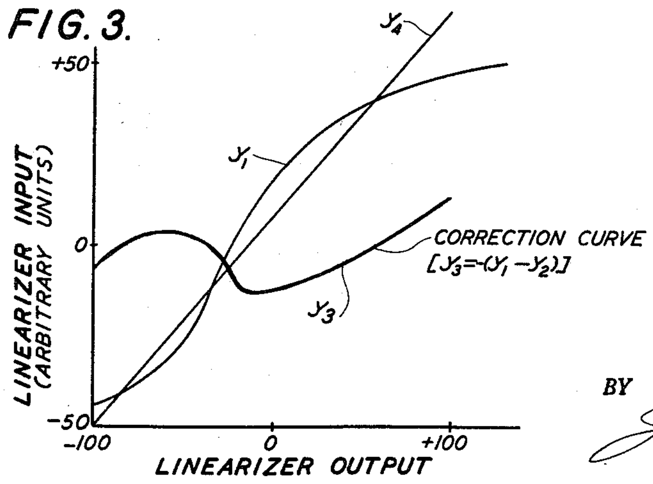
Fig. 3 is a graphical representation on the same coordinates as Fig. 1, showing the relation of the non-linear signal, deviation curve and corrected linearizer output.

The operation of the linearizing system of the invention is best displayed graphically in Figs. 1 through 3 inclusive, and reference is first had to these figures.

In Fig. 1 the output of a telemetering system, as a function of the percent of full scale input to the particular transducer involved, is plotted as curve $y_1$. Curve $y_2$ represents the linear curve of minimum deviation of the function represented by curve $y_1$. In other words, curve $y_2$ is that linear curve which most closely follows the non-linear curve $y_1$.

In Fig. 1 curve $y_1$ may be expressed as:

$$y_1=f(x) \quad (1)$$

where $x$=the input to the transducer, and curve $y_2$ may be expressed as:

$$y_2=mx+b \quad (2)$$

where:

$m$=slope, and
$b$=D. C. offset

The D. C. offset of linear curve $y_2$ is defined as the displacement of the curve from a curve of zero reference.

In Fig. 2 a deviation curve is plotted representing the excursions of curve $y_1$ (Fig. 1) from linear curve $y_2$ (Fig. 1). The vertical scale of Fig. 2 is expanded to amplify the apparent deviation. Dynamic linearization is accomplished in accordance with the present invention by adding to the non-linear signal as represented by curve $y_1$ a correction signal comprising the negative of the deviation curve. This correction signal is represented in Fig. 3 as curve $y_3$ which may be expressed as:

$$y_3=-(y_1-y_2)$$

Fig. 3 also includes non-linear curve $y_1$ and curve $y_4$ representing the corrected output of the linearizer. Curve $y_4$ is expressed:

$$y_4=y_1+y_3=y_2$$

The slope of curve $y_4$ may be adjusted as desired, by adjustment of the gain of the linearizer, and the curve may be shifted to zero reference by zero suppression of the linearizer amplifier. These are conventional techniques and form no part of the present invention.

It is important to appreciate that the non-linear input to the linearizer, as derived from a telemetering system for example, is not corrected as such. There is no total correction as in the case of conventional linearizers, correction in this instance being accomplished by addition to or subtraction from the non-linear signal of a correlative correction signal to arrive at the desired linearity.

Figures 4, 5:
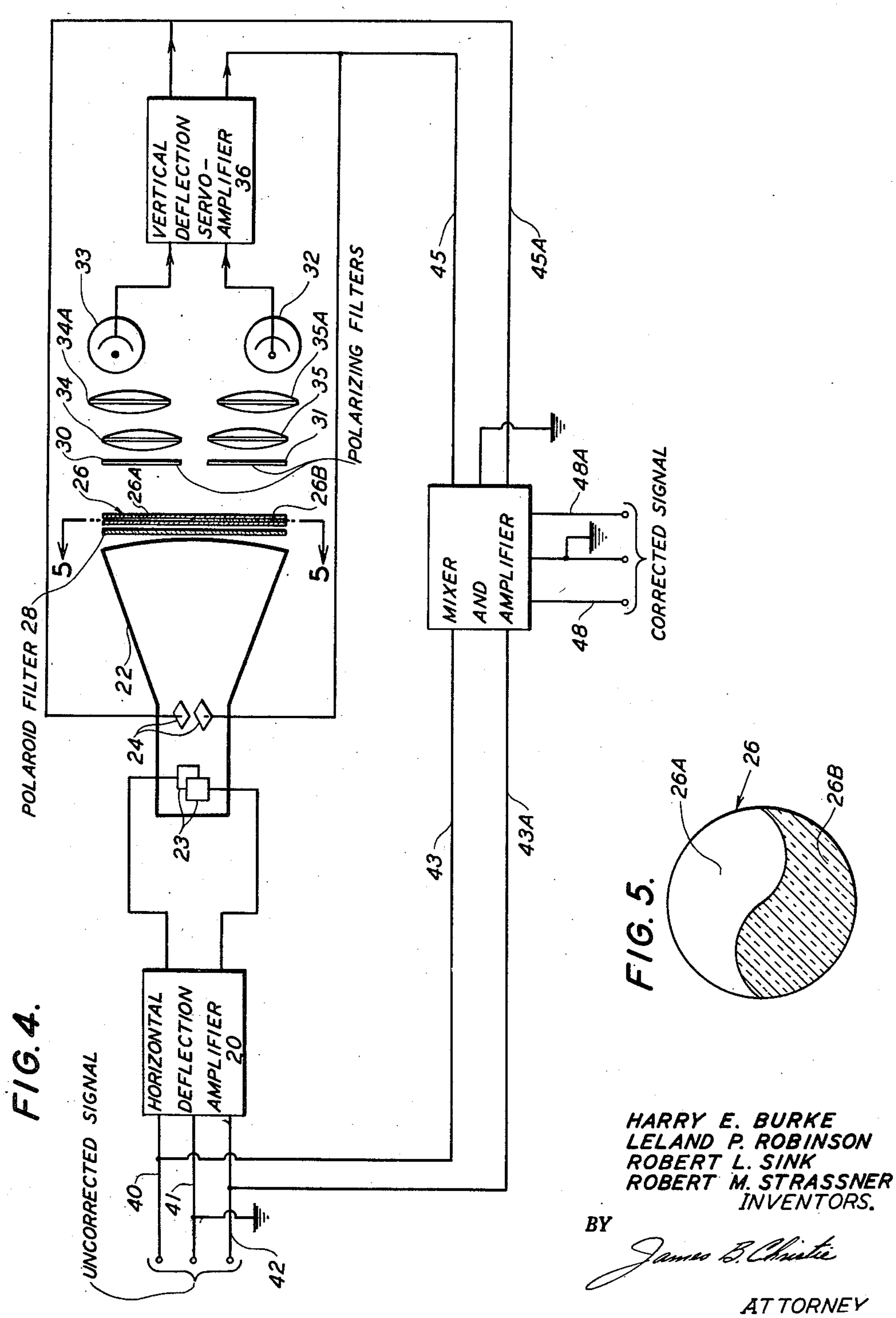
Fig. 4 is a schematic diagram of one form of linearizer in accordance with the invention.
Fig. 5 is an elevation taken on the line 5—5 of Fig. 4.

One embodiment of the invention is shown diagrammatically in Fig. 4. The system includes a horizontal deflection amplifier 20, a cathode ray tube 22 having horizontal deflection plates 23 and vertical deflection plates 24 and a screen 25. The output of amplifier 20 is connected to the horizontal deflection plates 23 to control the sweep of the electron beam responsive to the input signal.

A polarizer 28 is placed in front of the screen 25. A mask 26 shown in elevation in Fig. 5 is placed in front of polarizer 28. The mask 26 is constructed by placing an optically birefringent material 26B such as cellophane of such thickness as to constitute what is known as a quarter-wave plate in a suitable protective cover such as two pieces of glass. The optically birefringent medium occupies the portion of the field lying to one side of the curve representing the function to be generated and has that curve as boundary. When its optic axes are suitable oriented with respect to the optic axis of polarizer 28, the birefringent material acts to rotate the plane of polarization of light passing through it from polarizer 28 by 90°. Thus light passing through the birefringent portion 26B has a polarization vector oriented at 90° to the polarization of light passing through the clear or isotropic portion 26A. A pair of differently oriented polarizing filters 30, 31 distinguish light passing through section 26A of the mask from light passing through 26B of the mask.

The optical system comprising polarizing filters 30, 31 and a pair of photo-multiplier tubes 32, 33 with intermediate focussing lenses 34, 34A and 35, 35A is so arranged that the tube 32 sees only the light passing through, say section 26B of the mask. The filters 31 and 30 are oppositely polarized as described above so that filter 31 will pass light transmitted through the lower birefringent portion 26B of the mask and filter 30 will only pass light transmitted through the upper isotropic portion 26A of the mask. In this manner the light spot on the cathode ray tube screen is under observation by at least one phototube at all times. If below the line of cleavage between the mask sections, it will be seen only by photosensitive element 32. If the spot is centered on the cleavage line, it will be seen in part by both photocells.

The two phototubes are connected to a vertical deflection servo amplifier 36 which is connected at its output to the vertical deflection plates 24 to produce a servo loop so as to hold the electron beam of the cathode ray tube on the boundary between the contiguous sections of the mask. The uncorrected input signal is introduced as a differential signal into the horizontal amplifier 20 through input leads 40, 41 and 42 and into a mixer-amplifier network 44 as a differential signal. The output signal from the vertical deflection amplifier 36 is also introduced into the mixer-amplifier network 44 as a differential signal through leads 45, 45A. The output of the mixer-amplifier 44, as appearing across leads 48, 48A, comprises the algebraic sum of the uncorrected input signal and a predetermined function of the correction signal generated in the servo loop including the vertical deflection amplifier 36.

Figure 6:
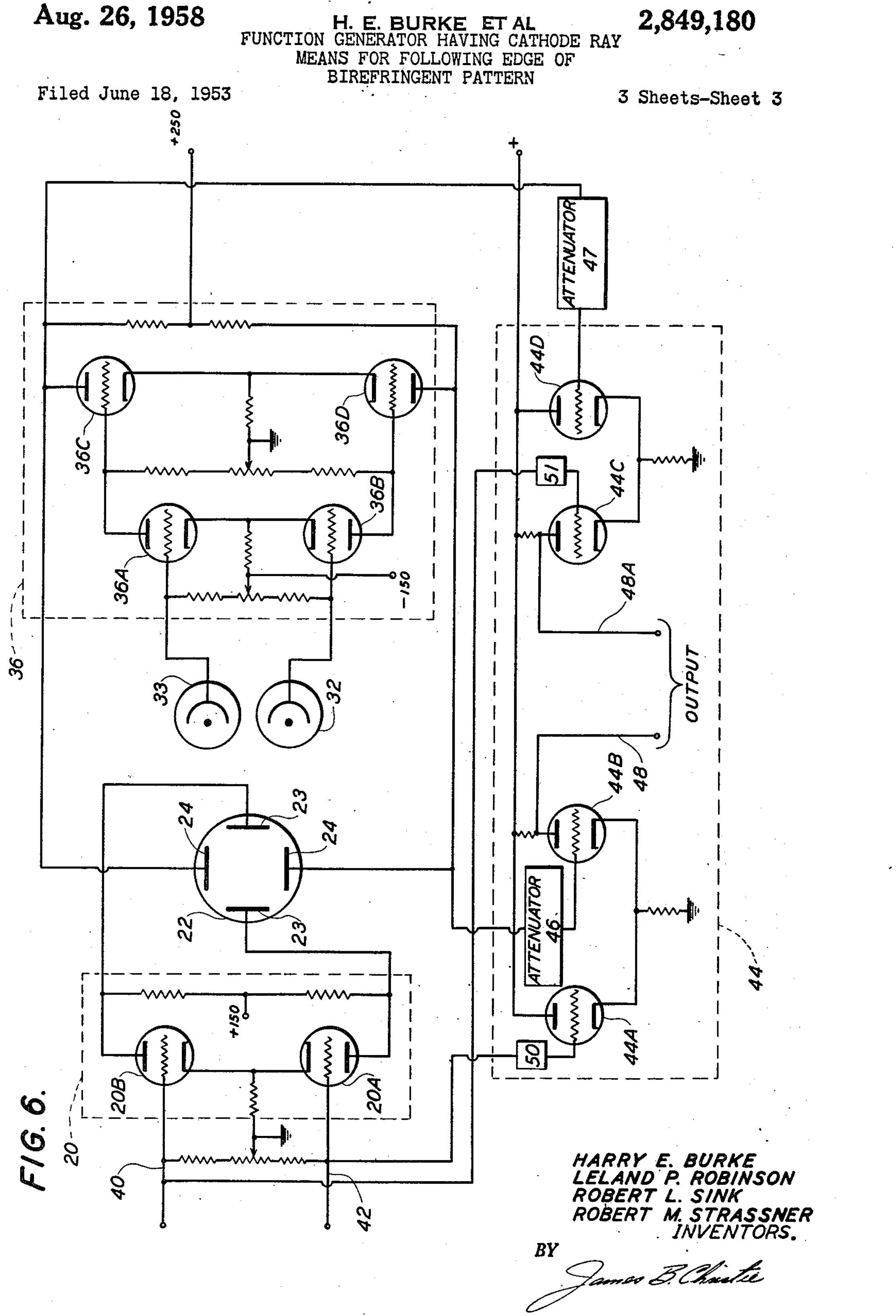
Fig. 6 is a simplified circuit diagram of the system of Fig. 4.

The same system is shown in simplified circuit diagram in Fig. 6 and to the extent of the identity of Figs. 4 and 6 the same reference characters are employed. The horizontal deflection amplifier 20 is connected to receive the differential input across leads 40 and 42 as the grid signal to a pair of vacuum tubes 20A, 20B. The plate voltages developed in the amplifier tubes are applied to the horizontal deflection plates 23 of the cathode ray tube 22. The signal across input leads 40, 42 is also applied directly as differential input to the mixer-amplifier 44. The output of the two photomultiplier tubes 32, 33 is applied as differential input to the grids of vacuum tubes 36A, 36B of the vertical deflection amplifier 36. The plate circuits of the tubes 36A, 36B are connected into the grids of second stage amplifier tubes 36C, 36D, respectively, with the plate circuits of these two tubes being connected to the vertical deflection plates 24 of the cathode ray tube 22 and also as a differential input to the grids of tubes 44B and 44D of the mixer-amplifier.

The differential amplifier 44 in effect comprises two differential amplifiers, each pair of tubes 44A, 44B and 44C, 44D having differential inputs. The input sections of the amplifier have double-ended input and single-ended output. The single-ended output of the two amplifier sections represents the output of the system and comprises the amplified algebraic sum of the uncorrected input signal and a fraction of the developed correction signal.

The correction signal developed in the system is an amplified function of the instantaneous deviation of the non-linear input from linearity. Amplification is accomplished both in the photoelectric section of the system, as explained above, and in the amplifier sections 20 and 36. A fraction only of the correction signal is applied to the uncorrected signal in the mixer-amplifier 44. Attenuators 46, 47 are connected respectively in the grid circuits of tubes 44B, 44D for this purpose.

The photoelectric components of the system, including the cathode ray tube 22 and phototubes 32, 33, introduce a time delay in the development of the correction signal. The response time is thus determined by the delay time of the phosphor employed in these elements. If this response time is of sufficient magnitude to introduce significant error in the corrected signal, suitable time delay networks 50, 51 may be incorporated in the mixer-amplifier so that the uncorrected input will have a delay time corresponding to that of the correction signal.

The use and operation of the system is as follows: The transducer whose output represents the non-linear function to be linearized is first calibrated to develop a calibration curve (curve $y_1$ in Fig. 1). From this calibration curve an amplified deviation plot is developed (curve $y_1$—$y_2$ of Fig. 2). From this deviation plot the mask member is constructed with the significant contour thereof, i. e. the line of cleavage between areas of differing light transmitting characteristics, conforming in configuration to the developed deviation plot. The circuit constants of the system may then be adjusted to select the slope and point of origin of the output signal in accordance with the values used in developing the deviation plot.

As the transducer output is received in the horizontal deflection amplifier, the cathode ray beam is moved horizontally toward the correlative point of the deviation plot as represented in this instance by the mask. If the instantaneous bias on the beam as developed by the vertical deflection plates differs from that necessary to position it in alignment with the significant contour of the mask, one of the two photocells will receive more light than the other. Such differential illumination of the two photocells will produce a proportionate unbalance signal in the vertical deflection amplifier. This unbalance signal, fed to the vertical deflection plates, aligns the beam. This signal also represents an amplified value of the correction signal (curve $y_3$ in Fig. 3) required to linearize the correlative instantaneous value of the non-linear input signal and is attenuated as required and fed to the mixer-amplifier where the two signals are added. The output of the mixer-amplifier thus becomes the desired linear counter-part of the non-linear input.

In the event the output of the transducer of interest is linear in a certain range, this condition will show up in the deviation plot and also in the optically significant contour of the mask. Input to the horizontal deflection amplifier in this linear range sweeps the electron beam into the corresponding portion of the mask. Since the signal is linear the beam remains aligned with the optically significant contour of the mask, no error signal is produced and no correction signal is added to the input signal in the mixer-amplifier. The linear portions of the input signal thus pass through unaltered, save for amplification as desired.

As a function generator, the system operates in much the same manner. A sweep voltage generator replaced the non-linear input. The mask contour determines the character of the generated function and the mixer amplifier need not come into use unless it is desired to combine the generated function with another signal.

Preferably the invention embodies a function generating mask including a birefringent area delineating the nature of the function and associated with a polarizing filter and optical filters all as illustrated. As an alternative, the mask itself can be made of a polarizing medium thus eliminating the need of the polarizing filter 28. However, polarizing material is costly and such a mask would require careful edge matching in the definition of the function. By using instead a polarizing filter and a birefringement medium such as cellophane, any number of masks can be made at low cost in time and money and no edge matching is required.

We claim:

1. A function generator comprising a cathode ray tube having horizontal and vertical deflection plates, a polarizing filter disposed in front of the screen of the tube, a mask having two contiguous sections one isotropic and the other birefringent with the line of cleavage between the sections defining the wave form of the function, means connected to the horizontal deflection plates to sweep the cathode beam across the tube screen, a pair of photosensitive means, a pair of polarized filters positioned respectively in front of said pair of photosensitive means, whereby the photosensitive means are each sensitive to light passing through a different one of the mask sections, electrical means connected to develop an electrical signal proportional to any difference in light intensity received at the two photosensitive means, and means for applying the electrical signal to the vertical deflection plates to overcome any such difference.

2. Apparatus for linearizing a non-linear signal which comprises a cathode ray tube having horizontal and vertical deflection plates, a polarizing filter mounted adjacent the screen of the cathode ray tube, an isotropic mask positioned to receive light from the cathode ray screen and passed by the filter, the mask including a section of a birefringent medium conforming in outline shape along one edge to a function of the deviations of the non-linear signal from linearity, a pair of photosensitive means each sensitive to light passing through a different one of the mask sections, and means connected to the two photosensitive means and to one set of deflection plates for applying a signal to said one set of deflection plates proportional to the differential light reception of the two photosensitive means.

3. Apparatus for linearizing a non-linear signal which comprises a cathode ray tube having horizontal and vertical deflection plates, a polarizing filter mounted adjacent the screen of the cathode ray tube, a mask positioned to receive light passed from the cathode ray screen and passed by the filter, the mask including an isotropic section and a contiguous birefringent section with the boundary between the sections conforming to the deviations of the non-linear signal from linearity, a pair of photosensitive means each sensitive to light passing through a different one of the mask elements, an amplifier connected at its input to receive the differential output of the two photosensitive means and at its output to one set of deflection plates, and a mixing network connected to develop the algebraic sum of the non-linear input signal and the output of the amplifier.

4. Apparatus for linearizing a non-linear signal which comprises a cathode ray tube having horizontal and vertical deflection plates, a polarizing filter mounted adjacent the screen of the cathode ray tube, a mask having an isotropic section and a contiguous birefringent section in the form of a quarter-wave plate, with the boundary between the sections conforming to an amplified function of the deviations of the non-linear signal from linearity, a pair of photosensitive elements, a separate polarizing filter disposed between the mask and each photocell, the two filters being differently oriented with one filter being oriented to pass light which is transmitted through the isotropic section of the mask and the other filter being oriented to pass light which is transmitted through the birefingent section of the mask, an amplifier connected at its input to receive the differential output of the two sensitive elements and at its output to the other set of deflection plates, and a mixing network connected to develop the algebraic sum of the non-linear input signal and a predetermined fraction of the output of the amplifier.

5. Apparatus for linearizing a non-linear signal which comprises a cathode ray tube having horizontal and vertical deflection plates, a first amplifier connected at its input to receive the non-linear signal and at its output to one set of deflection plates, a polarizing filter mounted adjacent the screen of the cathode ray tube, a mask having two contiguous sections, one isotropic and the other birefringent in the form of a quarter-wave plate with the boundary between the sections conforming to an amplified function of the deviations of the non-linear signal from linearity, a pair of photosensitive means each sensitive to light passing through a different one of the mask sections, a second amplifier connected at its input to receive the differential output of the two photosensitive means and at its output to the other set of deflection plates, and a mixing network connected to develop the algebraic sum of the non-linear input signal and a predetermined fraction of the output of the second amplifier.

6. Apparatus for linearizing a non-linear signal which comprises a cathode ray tube having horizontal and vertical deflection plates, a first amplifier connected at its input to receive the non-linear signal and at its output to one set of deflection plates, a polarizing filter mounted adjacent the screen of the cathode ray tube, a mask having two contiguous sections one isotropic and the other birefringent in the form of a quarter-wave plate with the boundary between the sections conforming to an amplified function of the deviations of the non-linear signal from linearity, a pair of photosensitive elements, a separate polarizing filter interposed between the masks and each photosensitive element, the two filters being of different optical orientation with one filter being oriented to pass light which is transmitted through the isotropic section of the mask and the other filter being oriented to pass light which is transmitted through the birefringent section of the mask, a second amplifier connected at its input to receive the differential of the output of the two photosensitive elements and at its output to the other set of deflection plates, and a mixing network connected to develop the algebraic sum of the non-linear input signal and a predetermined fraction of the output of the second amplifier.

References Cited in the file of this patent

UNITED STATES PATENTS

| | | |
|---|---|---|
| 2,451,465 | Barney | Oct. 19, 1948 |
| 2,461,667 | Sunstein | Feb. 15, 1949 |
| 2,497,042 | Doll | Feb. 7, 1950 |
| 2,528,020 | Sunstein | Oct. 31, 1950 |
| 2,649,542 | Glass | Aug. 18, 1953 |
| 2,651,771 | Palmer | Sept. 8, 1953 |
| 2,734,137 | Patterson | Feb. 7, 1956 |

OTHER REFERENCES

Book: Electric Analog Computers by Korn and Korn, McGraw-Hill, 1952 (copyright May 22), only page 256 cited.